United States Patent
O'Sullivan et al.

(10) Patent No.: US 6,560,656 B1
(45) Date of Patent: May 6, 2003

(54) APPARATUS AND METHOD FOR PROVIDING DOWNLOADABLE CODE FOR USE IN COMMUNICATING WITH A DEVICE IN A DISTRIBUTED SYSTEM

(75) Inventors: Bryan O'Sullivan, San Francisco, CA (US); Robert Scheifler, Somerville, MA (US); Peter C. Jones, Winchester, MA (US); Ann M. Wollrath, Groton, MA (US); Kenneth C. R. C. Arnold, Lexington, MA (US); James H. Waldo, Dracut, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/044,939

(22) Filed: Mar. 20, 1998

Related U.S. Application Data

(60) Provisional application No. 60/076,048, filed on Feb. 26, 1998.

(51) Int. Cl.$^7$ .................... G06F 15/16; G06F 15/177
(52) U.S. Cl. ...................... 709/250; 709/220
(58) Field of Search ................. 709/225, 223, 709/229, 315, 317, 204, 205, 206, 220, 250; 713/200, 201, 202; 707/10

(56) References Cited

U.S. PATENT DOCUMENTS

| | | |
|---|---|---|
| 4,430,699 A | 2/1984 | Segarra et al. |
| 4,491,946 A | 1/1985 | Kryskow, Jr. et al. |
| 4,558,413 A | 12/1985 | Schmidt et al. |
| 4,713,806 A | 12/1987 | Oberlander et al. |
| 4,809,160 A | 2/1989 | Mahon et al. |
| 4,823,122 A | 4/1989 | Mann et al. |
| 4,939,638 A | 7/1990 | Stephenson et al. |
| 4,956,773 A | 9/1990 | Saito et al. |
| 5,088,036 A | 2/1992 | Ellis et al. ............. 395/425 |

(List continued on next page.)

FOREIGN PATENT DOCUMENTS

| | | |
|---|---|---|
| EP | 0 300 516 A | 1/1989 |
| EP | 0 351 536 A3 | 1/1990 |
| EP | 0 384 339 A | 2/1990 |
| EP | 0 472 874 A1 | 3/1992 |
| EP | 0 474 340 A | 3/1992 |
| EP | 497 022 A1 | 8/1992 |
| EP | 0 555 997 A | 8/1993 |
| EP | 0 565 849 A | 10/1993 |
| EP | 0 569 195 A2 | 11/1993 |

(List continued on next page.)

OTHER PUBLICATIONS

Hodges, Douglas, "Managing Object Lifetimes in OLE," Aug. 25, 1994, p. 1–41.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Burns et al., "An Analytical Study of Opportunistic Lease Renewal," Distributed Computing Systems, 21st International Conference, pp. 146–153, Apr. 2000.

(List continued on next page.)

*Primary Examiner*—Zarni Maung
*Assistant Examiner*—Jason D. Cardone
(74) *Attorney, Agent, or Firm*—Finnegan Henderson Farabow Garrett & Dunner LLP

(57) ABSTRACT

Downloading code for communicating with a device that joins a network. When the device joins the network, it transmits a multicast packet including a reference to code for use in communicating with the device. Receivers in the network use the reference to download the code for constructing objects to communicate with the device, and the receivers respond with a reference to a lookup service in the network. Using the reference from the receivers, the device registers with the lookup service.

12 Claims, 5 Drawing Sheets

U.S. PATENT DOCUMENTS

| | | | |
|---|---|---|---|
| 5,109,486 A | 4/1992 | Seymour | |
| 5,187,787 A | 2/1993 | Skeen et al. | 395/600 |
| 5,218,699 A | 6/1993 | Brandle et al. | |
| 5,257,369 A | 10/1993 | Skeen et al. | 395/650 |
| 5,293,614 A | 3/1994 | Ferguson et al. | 395/600 |
| 5,297,283 A | 3/1994 | Kelly et al. | |
| 5,307,490 A | 4/1994 | Davidson et al. | |
| 5,311,591 A | 5/1994 | Fischer | |
| 5,339,435 A | 8/1994 | Lubkin et al. | |
| 5,386,568 A | 1/1995 | Wold et al. | |
| 5,390,328 A | 2/1995 | Frey et al. | |
| 5,392,280 A | 2/1995 | Zheng | |
| 5,423,042 A | 6/1995 | Jalili et al. | |
| 5,440,744 A | 8/1995 | Jacobson et al. | |
| 5,448,740 A | 9/1995 | Kiri et al. | |
| 5,452,459 A | 9/1995 | Drury et al. | |
| 5,455,952 A | 10/1995 | Gjovaag | |
| 5,471,629 A | 11/1995 | Risch | |
| 5,475,792 A | 12/1995 | Stanford et al. | |
| 5,475,817 A | 12/1995 | Waldo et al. | |
| 5,481,721 A | 1/1996 | Serlet et al. | |
| 5,504,921 A | 4/1996 | Dev et al. | |
| 5,511,197 A | 4/1996 | Hill et al. | |
| 5,524,244 A | 6/1996 | Robinson et al. | |
| 5,548,726 A | 8/1996 | Pettus | |
| 5,553,282 A | 9/1996 | Parrish et al. | |
| 5,555,367 A | 9/1996 | Premerlani et al. | |
| 5,555,427 A | 9/1996 | Aoe et al. | |
| 5,557,798 A | 9/1996 | Skeen et al. | 395/650 |
| 5,560,003 A | 9/1996 | Nilsen et al. | 395/600 |
| 5,561,785 A | 10/1996 | Blandy et al. | 395/497.01 |
| 5,577,231 A | 11/1996 | Scaizi et al. | |
| 5,594,921 A | 1/1997 | Pettus | |
| 5,603,031 A | 2/1997 | White et al. | 395/683 |
| 5,617,537 A | 4/1997 | Yamada et al. | |
| 5,628,005 A | 5/1997 | Hurvig | |
| 5,640,564 A | 6/1997 | Hamilton et al. | |
| 5,644,768 A | 7/1997 | Periwal et al. | |
| 5,652,888 A | 7/1997 | Burgess | |
| 5,655,148 A | 8/1997 | Richman et al. | 395/828 |
| 5,659,751 A | 8/1997 | Heninger | 395/685 |
| 5,671,225 A | 9/1997 | Hooper et al. | |
| 5,675,796 A | 10/1997 | Hodges et al. | |
| 5,675,797 A | 10/1997 | Chung et al. | |
| 5,680,573 A | 10/1997 | Rubin et al. | |
| 5,680,617 A | 10/1997 | Gough et al. | |
| 5,684,955 A | 11/1997 | Meyer et al. | |
| 5,689,709 A | 11/1997 | Corbett et al. | |
| 5,706,435 A | 1/1998 | Barbara | |
| 5,706,502 A | 1/1998 | Foley et al. | |
| 5,724,588 A | 3/1998 | Hill et al. | |
| 5,727,145 A | 3/1998 | Nessett et al. | |
| 5,737,607 A | 4/1998 | Hamilton et al. | |
| 5,745,678 A | 4/1998 | Herzberg et al. | |
| 5,745,695 A | 4/1998 | Gilchrist et al. | |
| 5,745,703 A | 4/1998 | Cetjin et al. | |
| 5,745,755 A | 4/1998 | Covey | |
| 5,748,897 A | 5/1998 | Katiyar | |
| 5,754,849 A | 5/1998 | Dyer et al. | |
| 5,757,925 A | 5/1998 | Faybishenko | |
| 5,758,344 A | 5/1998 | Prasad et al. | |
| 5,761,656 A | 6/1998 | Ben-Schachar | |
| 5,764,897 A | 6/1998 | Khalidi | |
| 5,768,532 A | 6/1998 | Megerian | |
| 5,774,551 A | 6/1998 | Wu et al. | |
| 5,778,187 A | 7/1998 | Monteiro et al. | |
| 5,778,228 A | 7/1998 | Wei | |
| 5,778,368 A | 7/1998 | Hogan et al. | |
| 5,784,560 A | 7/1998 | Kingdon et al. | |
| 5,787,425 A | 7/1998 | Bigus | |
| 5,787,431 A | 7/1998 | Shaughnessy | |
| 5,790,548 A | 8/1998 | Sistanizadeh et al. | |
| 5,802,367 A | 9/1998 | Held et al. | |
| 5,805,805 A * | 9/1998 | Civanlar et al. | 709/220 |
| 5,808,911 A | 9/1998 | Tucker et al. | |
| 5,809,507 A | 9/1998 | Cavanaugh, III | |
| 5,812,819 A | 9/1998 | Rodwin et al. | |
| 5,813,013 A | 9/1998 | Shakib et al. | |
| 5,815,149 A | 9/1998 | Mutschler, III et al. | |
| 5,815,709 A | 9/1998 | Waldo et al. | |
| 5,815,711 A | 9/1998 | Sakamoto et al. | |
| 5,818,448 A | 10/1998 | Katiyar | |
| 5,829,022 A | 10/1998 | Watanabe et al. | |
| 5,832,219 A | 11/1998 | Pettus | |
| 5,832,529 A | 11/1998 | Wollrath et al. | |
| 5,832,593 A | 11/1998 | Malik et al. | |
| 5,835,737 A | 11/1998 | Sand et al. | |
| 5,842,018 A | 11/1998 | Atkinson et al. | |
| 5,844,553 A | 12/1998 | Hao et al. | |
| 5,845,090 A | 12/1998 | Collins, III et al. | |
| 5,845,129 A | 12/1998 | Wendorf et al. | |
| 5,860,004 A | 1/1999 | Fowlow et al. | |
| 5,860,153 A | 1/1999 | Matena et al. | |
| 5,864,862 A | 1/1999 | Kriens et al. | |
| 5,864,866 A | 1/1999 | Henckel et al. | |
| 5,867,653 A * | 2/1999 | Aras et al. | 709/204 |
| 5,872,928 A | 2/1999 | Lewis et al. | |
| 5,872,973 A | 2/1999 | Mitchell et al. | |
| 5,875,335 A | 2/1999 | Beard | |
| 5,878,411 A | 3/1999 | Borroughs et al. | |
| 5,884,024 A | 3/1999 | Lim et al. | |
| 5,884,079 A | 3/1999 | Furusawa | |
| 5,886,707 A * | 3/1999 | Berg | 345/433 |
| 5,887,134 A | 3/1999 | Ebrahim | |
| 5,889,951 A | 3/1999 | Lombardi | |
| 5,890,158 A | 3/1999 | House et al. | |
| 5,892,904 A | 4/1999 | Atkinson et al. | |
| 5,913,029 A | 6/1999 | Shostak | |
| 5,933,497 A | 8/1999 | Beetcher et al. | |
| 5,933,647 A | 8/1999 | Aronberg et al. | |
| 5,935,249 A | 8/1999 | Stern et al. | |
| 5,940,391 A * | 8/1999 | Malkin et al. | 370/390 |
| 5,940,827 A | 8/1999 | Hapner et al. | |
| 5,944,793 A | 8/1999 | Islam et al. | |
| 5,946,485 A | 8/1999 | Weeren et al. | |
| 5,946,694 A | 8/1999 | Copeland et al. | |
| 5,949,998 A | 9/1999 | Fowlow et al. | |
| 5,951,652 A | 9/1999 | Ingrassia, Jr. et al. | |
| 5,956,509 A | 9/1999 | Kevner | |
| 5,963,947 A | 10/1999 | Ford et al. | |
| 5,964,836 A * | 10/1999 | Rowe et al. | 709/221 |
| 5,966,531 A | 10/1999 | Skeen et al. | |
| 5,969,967 A | 10/1999 | Aahlad et al. | |
| 5,973,696 A * | 10/1999 | Agranat et al. | 345/357 |
| 5,974,201 A | 10/1999 | Chang et al. | |
| 5,978,484 A | 11/1999 | Apperson et al. | |
| 5,982,773 A * | 11/1999 | Nishimura et al. | 370/395.53 |
| 5,987,506 A | 11/1999 | Carter et al. | |
| 5,999,179 A | 12/1999 | Kekic et al. | |
| 5,999,988 A | 12/1999 | Pelegri-Llopart et al. | |
| 6,003,763 A | 12/1999 | Gallagher et al. | |
| 6,006,253 A * | 12/1999 | Kumar et al. | 709/204 |
| 6,009,103 A | 12/1999 | Woundy | |
| 6,016,496 A | 1/2000 | Roberson | |
| 6,016,516 A | 1/2000 | Horikiri | |
| 6,023,586 A | 2/2000 | Gaisford et al. | |
| 6,026,414 A | 2/2000 | Anglin | |
| 6,031,977 A | 2/2000 | Pettus | |
| 6,032,151 A | 2/2000 | Arnold et al. | |
| 6,044,381 A | 3/2000 | Boothby et al. | |
| 6,049,878 A * | 4/2000 | Caronni et al. | 713/201 |

| | | | |
|---|---|---|---|
| 6,052,761 A | | 4/2000 | Hornung et al. |
| 6,058,383 A | | 5/2000 | Narasimhalu et al. |
| 6,061,699 A | | 5/2000 | DiCecco et al. |
| 6,061,713 A | | 5/2000 | Bharadhwaj |
| 6,067,575 A | | 5/2000 | McManis et al. |
| 6,075,863 A | * | 6/2000 | Krishnan et al. ........... 713/191 |
| 6,085,255 A | | 7/2000 | Vincent et al. |
| 6,108,346 A | | 8/2000 | Doucette et al. |
| 6,134,581 A | * | 10/2000 | Ismael et al. ............... 709/202 |
| 6,134,603 A | | 10/2000 | Jones et al. |
| 6,138,144 A | * | 10/2000 | DeSimone et al. ......... 709/204 |
| 6,154,463 A | * | 11/2000 | Aggarwal et al. .......... 370/408 |
| 6,161,137 A | * | 12/2000 | Ogdon et al. ............... 709/224 |
| 6,173,314 B1 | * | 1/2001 | Kurashima et al. ......... 709/204 |
| 6,182,083 B1 | | 1/2001 | Scheifler et al. |
| 6,185,602 B1 | | 2/2001 | Bayrakeri |
| 6,185,611 B1 | | 2/2001 | Waldo et al. |
| 6,199,116 B1 | * | 3/2001 | May et al. ................... 709/310 |
| 6,212,676 B1 | * | 4/2001 | Seaman et al. ................ 717/4 |
| 6,216,138 B1 | | 4/2001 | Wells et al. |
| 6,226,746 B1 | | 5/2001 | Scheifler |
| 6,247,091 B1 | | 6/2001 | Lovett |
| 6,263,379 B1 | | 7/2001 | Atkinson et al. |
| 6,282,295 B1 | | 8/2001 | Young et al. |
| 6,282,568 B1 | | 8/2001 | Sondur et al. |
| 6,339,783 B1 | | 1/2002 | Horikiri |

FOREIGN PATENT DOCUMENTS

| | | |
|---|---|---|
| EP | 0 625 750 A | 11/1994 |
| EP | 0 635 792 A | 1/1995 |
| EP | 0 651 328 A | 5/1995 |
| EP | 0 660 231 A | 6/1995 |
| EP | 0 718 761 A | 12/1995 |
| EP | 0 697 655 A2 | 2/1996 |
| EP | 0 810 524 A | 5/1997 |
| EP | 0 778 520 A2 | 6/1997 |
| EP | 0 767 432 A2 | 9/1997 |
| EP | 0 794 493 A2 | 9/1997 |
| EP | 0 803 810 A2 | 10/1997 |
| EP | 0 803 811 A | 10/1997 |
| EP | 0 805 393 A2 | 11/1997 |
| EP | 0 817 020 A | 1/1998 |
| EP | 0 817 022 A2 | 1/1998 |
| EP | 0 817 025 A | 1/1998 |
| EP | 0 836 140 A2 | 4/1998 |
| GB | 2 253 079 A | 8/1992 |
| GB | 0 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO 93/25962 A1 | 12/1993 |
| WO | WO94/03855 A | 2/1994 |
| WO | WO96/03692 A | 2/1996 |
| WO | WO96/10787 A | 4/1996 |
| WO | WO96/18947 A | 6/1996 |
| WO | WO96/24099 A | 8/1996 |
| WO | WO98/02814 | 1/1998 |
| WO | WO98/04971 | 2/1998 |

OTHER PUBLICATIONS

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, Proceedings of the 31st Hawaii Internat'l, Conference, Jan. 6–9, 1998, pp. 574–578.

Gray et al., "Leases: An Efficient Fault–Tolerant Mechanism for Distributed File Cache Consistency," Proceedings of the 12th ACM Symposium on Operating Systems Principles, pp. 202–210, 1989.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

Hoshi et al., "Allocation of the Cross–Connect Function in Leased Circuit Networks," 1992, ICC'92, conference record, Supercomm/ICC '92, A New World of Communications, IEEE International Conference, pp. 1408–1412.

IBM Technical Disclosure Bulletin, "Local Network Monitoring to Populate Access Agent Directory," vol. 36, No. 09A, pp. 403–405, Sep. 1993.

McGrath, "Discovery and Its Discontents: Discovery Protocols for Ubiquitous Computing," Presented at Center for Excellence in Space Data and Information Science, NASA Goddard Space Flight Center, Apr. 5, 2000.

MUX–Elektronik, Java 1.1 Interactive Course, www.lls.se/~mux/javaic.html, 1995.

Stevenson, "Token–Based Consistency of Replicated Servers," IEEE, CH2686–4/89/0000/0179, pp. 179–183, 1989.

Yin et al., "Volume Leases for Consistency in Large–Scale Systems," IEEE Transactions on Knowledge & Data Engineering, vol. 11, No. 4, pp. 563–576, Jul./Aug. 1999.

Alexander, et al., "Active Bridging", Proceedings of the ACM/SIGCOMM'97 Conference, Cannes, France, 9/97.

Anonymous: "Change–Notification Service for Shared Files" IBM Technical Disclosure Bulletin, vol. 36, No. 8, pp. 77–82, XP002108713 New York, US.

Anonymous: "Resource Preemption for Priority Scheduling." Nov. 1973. IBM Technical Disclosure Bulletin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam vol. 9, No. 2, pp. 179–192.

Birrell et al., "Implementing Remote Procedure Calls", ACM Transactions on Computer Systems, vol. 2, No. 1, Feb. 1984, pp. 39–59.

Dave A et al: "Proxies, Application Interface, and Distributed Systems", Proceedings International Workshop on Object Orientation in Operating Systems, Sep. 24, 1992, pp. 212–220.

Deux O et al: "The 02 System" Communications of the Association for Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", http://www.cis.ohio-state.edu/htbin/rfc/rfc1541.html, Oct. 1993, pp. 1–33.

Emms J: "A Definition of an Access Control Systems Language" Computer Standards and Interfaces, vol. 6, No. 4, Jan. 1, 1987, pp. 443–454.

Gosling et al., "The Java (TM) Language Specification", Addison-Wesley, 1996.

Gottlob et al., "Extending Object–Oriented Systems with Roles," ACM Transactions on information systems, vol. 14, No. 3, pp. 268–296 (Jul. 1996).

Hamilton et al., "Subcontract: a flexible base for distributed programming"; Proceedings of 14th Symposium of Operating System Principles; (Dec. 1993).

Hartman, J., Manber, U., et al., Liquid Software: A new paradigm for networked systems, Technical Report 96–11, Department of Comp. Sci., Univ. of Arizona, 6/96.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" Somobjects Developer Toolkit Users Guide, Version 2.1, Oct. 1994, pp. 6-1-6-90.

Jones, Richard, et al., "Garbage Collection: Algorithms for Automatic Dynamic Memory Management," pp. 165–175, John Wiley & Sons, 1996.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Lindholm et al., "The Java (TM) Virtual Machine Specification", Addison Wesley, 1996.

Mitchell et al.; "An Overview of the Spring System"; (Feb. 1994).

Orfali R. et al., "The Essential Distributed Objects Survival Guide," Chapter 11: Corba Commerical ORBs pp. 203–215, John Wiley & Sons, Inc., (1996).

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE", Chapters 1–3, 6; (1992).

Venners, B., "Jini Technology, Out of the Box", Javaworld, Online!, pp 1–4, Dec. 1998.

Waldo J et al: "Events in an RPC based distributed system" Processing of the 1995 USENIX Technical Conference, Proceedings USENIX Winter 1995 Technical Conference, New Orleans, LA. USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type system for an Object–Oriented Database System," Proceedings of the International Computer Software and Applications Conference (COMPSAC), pp. 333–338, Sep. 11–13, 1991, Tokyo, Japan.

Yemini, Y. and S. da silva, "Towards Programmable Networks", IFIP/IEEE International Workshop on Distributed Systems: Operations and Management, L'Aquila, Italy, 10/96.

Yin J. et al., "Using Leases to Support Server Driven Consistency in Large–Scale Systems", Computer Services Department, University of Texas at Austin, p. 285–294.

Guth, Rob: "JavaOne: Sun to Exapnd Java Distributed Computing Effort", http://www.sunworld.com/swol-02-1998/swol-02-sunspots.html, XP-002109935, p. 1 (1998).

Mullender, Distributed Systems, Second Edition, Addison-Wesley, 1993.

Howard et al., Scale and Performance in a Distributed File System, ACM Transactions on Computer Systems, vol. 6, No. 1, Feb. 1988, pp. 51–81.

Cardelli, Obliq, A lightweight language for network objects, Nov. 5, 1993, pp. 1–37.

Dijkstra, Self–stabilizing Systems in Spite of Distributed Control, Communications of the ACM, vol. 17, No. 11, Nov. 1974, pp. 643–644.

Ousterhout et al., The Sprite Network Operating System, Computer, IEEE, Feb. 1988, pp. 23–36.

Dourish, A Divergence–Based Model of Synchrony and Distribution in Collaborative Systems, Xerox Technical Report EPC–1194–102, 1994, pp. 1–10.

Sharrott et al., ObjectMap: Integrating High Performance Resources into a Distributed Object–oriented Environment, ICODP, 1995.

Birrell et al., Grapevine: An Exercise in Distributed Computing, Communications of the ACM, vol. 25, No. 4, Apr. 1982, pp. 260–274.

Transparent Network Computing, Locus Computing Corporation, Jan. 5, 1995.

Gray et al., Leases: An Efficient Fault–Tolerant Mechanism for Distributed File Cache Consistency, ACM, 1989, pp. 202–210.

Lamport et al., The Byzantine Generals Problem, ACM Transactions on Programming Languages and Systems, vol. 4, No. 3, Jul. 1982, pp. 382–401.

Dolev et al., On the Minimal Synchronism Needed for Distributed Consensus, Journal of the ACM, vol. 34, No. 1, Jan. 1987, pp. 77–97.

Mummert et al., Long Term Distributed File Reference Tracing: Implementation and Experience, Carnegie Mellon University School of Computer Science, Nov. 1994, pp. 1–28.

Gelernter et al., Parallel Programming in Linda, Yale University, Jan. 1985, pp. 1–21.

Cannon et al., Adding Fault–Tolerant Transaction Processing to Linda, Software–Practice and Experience, vol. 24(5), May 1994, pp. 449–466.

Kambhatla et al., Recovery with Limited Replay: Fault–Tolerant Processes in Linda, Oregon Graduate Institute, Technical Report CSIE 90–019, Sep. 1990, pp. 1–16.

Anderson et al., Persistent Linda: Linda+Transactions+Query Processing, Proceedings of the 13th Symposium on Fault Tolerant Systems, 1994, pp. 93–109.

Gelernter, *Generative Communication in Linda*, ACM Transactions on Programming Languages and Systems, vol. 7, No. 1, Jan. 1985, pp. 80–112.

Carriero et al., *Distributed Data Structures in Linda*, Principals of Programming Language, 1986, pp. 1–16.

Pinakis, *Using Linda as the Basis of an Operating System Microkernel*, University of Western Australia, Department of Computer Science, Aug. 1993, pp. 1–165.

Linda Database Search, Jul. 20, 1995, pp. 1–68.

Carriero et al, *Distributed Data Structures in Linda*, Yale Research Report YALEU/DCS/RR–438, Nov. 1985.

Agha et al., *Actorspaces: An Open Distributed Programming Paradigm*, University of Illinois, Report No. UIUCDCS–R–92–1766, Open Systems Laboratory TR No. 8, Nov. 1992, pp. 1–12.

Ahmed et al., *A Program Building Tool for Parallel Applications*, Yale University, Dec. 1, 1993, pp. 1–23.

Liskov et al., *Distributed Object Management in Thor*, International Workshop on Distributed Object Management, 1992, pp. 12.

Coulouris et al., *Distributed Systems Concepts and Designs*, Second Edition, Addison–Wesley, 1994.

Birrell et al., *Network Objects*, DEC SRC Research Report 115, Feb. 28, 1994.

Birrell et al., *Distributed Garbage Collection for Network Objects*, DEC SRC Research Report 116, Dec. 15, 1993.

Jaworski, *Java 1.1 Developer's Guide*, Sams.net, 1997.

Wollrath et al., *A Distributed Object Model for the Java™ System*, USENIX Association, Conference on Object–Oriented Technologies and Systems, Jun. 17–21, 1996.

Harris et al., *Proposal for a General Java Proxy Class for Distributed Systems and Other Uses*, Netscape Communications Corp., Jun. 25, 1997.

Chung et al., *A 'Tiny' Pascal Compiler: Part 1: The P–Code Interpreter*, BYTE Publications, Inc., Sep. 1978.

Chung et al., *A 'Tiny' Pascal Compiler: Part 2: The P–Compiler*, BYTE Publications, Inc., Oct. 1978.

Thompson, *Regular Expression Search Algorithm*, Communications of the ACM, vol. II, No. 6, p. 149 et seq., Jun. 1968.

Mitchell et al., *Mesa Language Manual*, Xerox Corporation.

McDaniel, *An Analysis of a Mesa Instruction Set*, Xerox Corporation, May 1982.

Pier, *A Retrospective on the Dorado, A High–Performance Personal Computer*, Xerox Corporation, Aug. 1983.

Pier, *A Retrospective on the Dorado, A High–Performance Personal Computer*, IEEE Conference Proceedings, The 10th Annual international Symposium on Computer Architecture, 1983.

Krasner, *The Smalltalk–80 Virtual Machine*, BYTE Publications Inc., Aug. 1991, pp. 300–320.

*Operating Systems Review*, ACM Press, vol. 27, No. 5, Dec. 1993, pp. 217–230.

*Remote Method Invocation Specification*, Sun Microsystems, Inc., (1997), http://java.sun.com/products/jdk/1.1/docs/guide/rmi/spec/rmiTOC.doc.html.

"Eden Project Proposal," Department of Computer Science, University of Washington, Oct. 1980, Technical Report#80–10–01, cover and Foreword.

Almes et al., "Edmas: A Locally Distributed Mail System," Department of Computer Science, University of Washington, Technical Report 83–07–01, Jul. 7, 1983, Abstract & pp. 1–17.

Almes et al., "Research in Integrated Distributed Computing," Department of Computer Science, University of Washington, Oct. 1979, pp. 1–42.

Almes et al., "The Eden System: A Technical Review," Department of Computer Science, University of Washington, Technical Report 83–10–05, Oct. 1983, pp. 1–25.

Almes, "Integration and Distribution in the Eden System," Department of Computer Science, University of Washington, Technical Report 83–01–02, Jan. 19, 1983, pp. 1–18 & Abstract.

Almes, "The Evolution of the Eden Invocation Mechanism," Department of Computer Science, University of Washington, Technical Report 83–01–03, Jan. 19, 1983, pp. 1–14 & Abstract.

Arnold, Ken, "The Jini Architecture: Dynamic Services in a Flexible Network," Sun Microsytems, Inc., Proceedings of the 36th ACM IEEE Design Automation Conference, Jun. 1999, pp. 157–162.

Begole et al., "Transparent Sharing of Java Applets: A Replicated Approach," Oct. 1997, pp. 55–65.

Black et al,. "A Language for Distributed Programming," Department of Computer Science, University of Washington, Technical Report 86–02–03, Feb. 1986, p. 10.

Black et al., "Distribution and Abstract Types in Emerald," University of Washington, Technical Report No. 85–08–05, Aug. 1985, pp. 1–10.

Black et al., "Object Structure in the Emerald System," University of Washington, Technical Report 86–04–03, Apr. 1986, pp. 1–14.

Black et al., "The Eden Project: A Final Report," Department of Computer Science, University of Washington, Technical Report 86–11–01, Nov. 1986, pp. 1–28.

Black, "Supporting Distributed Applications: Experience wtih Eden," Department of Computer Science, University of Washington, Technical Report 85–03–02, Mar. 1985, pp. 1–21.

Black, "The Eden Programming Language," Department of Computer Science, FR–35, University of Washington, Technical Report 85–09–01, Sep. 1985 (Revised Dec. 1985), pp. 1–19.

Black, "The Eden Project: Overview and Experiences," Department of Computer Science, University of Washington, EUUG, Autumn '86 Conference Proceedings, Manchester, UK, Sep. 22–25, 1986, pp. 177–189.

Braine et al., "Object–Flow," 1997, pp. 418–419.

Ciancarini et al., "Coordinating Distributed Applets with Shade/Java," Feb. 1998, pp. 130–138.

Delcambre et al., "Simulation of the Object Flow Model: A Conceptual Modeling Language for Object–Driven Applications," 1993, pp. 216–225.

Goldberg et al., "Smalltalk–80—The Language and its Implementation," Xerox Palo Alto Research Center, 1983 (reprinted with corrections, Jul. 1985), pp. 1–720.

Holman et al., "The Eden Shared Calendar System," Department of Computer Science, FR–35, University of Washington, Technical Report 85–05–02, Jun. 22, 1985, pp. 1–14.

Hsu, "Reimplementing Remote Procedure Calls," University of Washington, Thesis, Mar. 22, 1985, pp. 1–106.

Hutchinson, "Emerald: An Object–Based Language for Distributed Programming," a Dissertation, University of Washington, 1987, pp. 1–107.

Jacob, "The Use of Distributed Objects and Dynamic Interfaces in a Wide–Area Transaction Environment," SIGCOMMn '95 Workshop on Middleware: Cambridge, Mass., Aug. 1995, pp. 1–3.

Jul et al., "Fine–Grained Mobility in the Emerald System," University of Washington, ACM Transactions on Computer Systems, vol. 6, No. 1, Feb. 1988, pp. 109–133.

Jul, "Object Mobility in a Distributed Object–Oriented System," a Dissertation, University of Washington, 1989, pp. 1–154 (1 page Vita).

Koshizuka et al., "Window Real–Objects: A Distributed Shared Memory for Distributed Implementation of GUI Applications," Nov. 1993, pp. 237–247.

Krasner et al., "Smalltalk–80: Bits of History, Words of Advice," 1983, Xerox Corporation, pp. 1–344.

Lavana et al., "Executable Workflows: A Paradigm for Collaborative Design on the Internet," Jun. 1997, 6 pages.

Proceedings of the Eighth Symposium on Operating Systems Principles, Dec. 14–16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR–85–12–04, Dec. 1985, pp. 1–156.

Pu, "Replication and Nested Transaction in the Eden Distributed System," Doctoral Dissertation, University of Washington, Aug. 6, 1986, pp. 1–179 (1 page Vita).

Trehan et al., "Toolkit for Shared Hypermedia on a Distributed Object Oriented Architecture," 1993, pp. 1–8.

* cited by examiner

APPARATUS AND METHOD FOR PROVIDING DOWNLOADABLE CODE FOR USE IN COMMUNICATING WITH A DEVICE IN A DISTRIBUTED SYSTEM

REFERENCE TO RELATED APPLICATIONS

The following identified U.S. patent applications are relied upon and are incorporated by reference in this application as if fully set forth.

Provisional U.S. Patent Application No. 60/076,048, entitled "Distributed Computing System," filed on Feb. 26, 1998.

U.S. patent application Ser. No. 09/044,923, entitled "Method and System for Leasing Storage," and filed on the same date herewith.

U.S. patent application Ser. No. 09/044,838, entitled "Method, Apparatus, and Product for Leasing of Delegation Certificates in a Distributed System," and filed on the same date herewith.

U.S. patent application Ser. No. 09/044,834, entitled "Method, Apparatus and Product for Leasing of Group Membership in a Distributed System," and filed on the same date herewith.

U.S. patent application Ser. No. 09/044,916, entitled "Leasing for Failure Detection," and filed on the same date herewith.

U.S. patent application Ser. No. 09/044,933, entitled "Method for Transporting Behavior in Event Based System," and filed on the same date herewith.

U.S. patent application Ser. No. 09/044,919, entitled "Deferred Reconstruction of Objects and Remote Loading for Event Notification in a Distributed System," and filed on the same date herewith.

U.S. patent application Ser. No. 09/044,938, entitled "Methods and Apparatus for Remote Method Invocation," and filed on the same date herewith.

U.S. patent application Ser. No. 09/045,652, entitled "Method and System for Deterministic Hashes to Identify Remote Methods," and filed on the same date herewith.

U.S. patent application Ser. No. 09/044,790, entitled "Method and Apparatus for Determining Status of Remote Objects in a Distributed System," and filed on the same date herewith.

U.S. patent application Ser. No. 09/044,930, entitled "Downloadable Smart Proxies for Performing Processing Associated with a Remote Procedure Call in a Distributed System," and filed on the same date herewith.

U.S. patent application Ser. No. 09/044,917, entitled "Suspension and Continuation of Remote Methods," and filed on the same date herewith.

U.S. patent application Ser. No. 09/044,835, entitled "Method and System for Multi-Entry and Multi-Template Matching in a Database," and filed on the same date herewith.

U.S. patent application Ser. No. 09/044,839, entitled "Method and System for In-Place Modifications in a Database," and filed on the same date herewith.

U.S. patent application Ser. No. 09/044,945, entitled "Method and System for Typesafe Attribute Matching in a Database," and filed on the same date herewith.

U.S. patent application Ser. No. 09/044,931, entitled "Dynamic Lookup Service in a Distributed System," and filed on the same date herewith.

U.S. patent application Ser. No. 09/044,826, entitled "Method and System for Facilitating Access to a Lookup Service," and filed on the same date herewith.

U.S. patent application Ser. No. 09/044,932, entitled "Apparatus and Method for Dynamically Verifying Information in a Distributed System," and filed on the same date herewith.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," and filed on the same date herewith.

U.S. patent application Ser. No. 09/044,934, entitled "Polymorphic Token-Based Control," and filed on the same date herewith.

U.S. patent application Ser. No. 09/044,915, entitled "Stack-Based Access Control," and filed on the same date herewith.

U.S. patent application Ser. No. 09/044,944, entitled "Stack-Based Security Requirements," and filed on the same date herewith.

U.S. patent application Ser. No. 09/044,837, entitled "Per-Method Designation of Security Requirements," and filed on the same date herewith.

FIELD OF THE INVENTION

The present invention relates to a system and method for transmitting objects between machines in a distributed system and more particularly to transmission of downloadable code for use in communicating with a device in a distributed system.

BACKGROUND OF THE INVENTION

Machines in a distributed system may communicate and access each other. When a device wants to join the distributed system, the machines already in the system typically must know how to communicate with the device. This requirement means that, for example, the machines must store code, drivers, and port information for any device that may join the system. In addition, they may be required to store stubs for communicating with any device that may join the system. A proxy stub is a reference to a remote object for use in reconstructing an object, and stubs facilitate communication between machines in a distributed system. These requirements may result in inefficiencies and increase memory or storage requirements due to the amount of prestored information required to communicate with devices that may join the system. Accordingly, a need exists for increased flexibility in transmitting code for communication between machines in a distributed system.

SUMMARY OF THE INVENTION

A first method consistent with the present invention transmits from a machine a multicast packet including a request to join a distributed system and including an indication of code for communicating with the machine. A response is received, the response including a reference to an entity for registration with the system, and a message is transmitted to the entity to register with the system.

A second method consistent with the present invention receives from a machine a multicast packet including a request to join a distributed system and including indication of code for communicating with the machine. The code is used to construct a response including a reference to an entity for registration with the system, and the response is transmitted to the machine.

A third method consistent with the present invention transmits from a first machine a first object including indication of code for communicating with the first machine, and a second machine receives the first object. The code is used for constructing a second object for communicating with the first machine, and the second object is transmitted from the second machine to the first machine.

A first apparatus consistent with the present invention transmits from a machine a multicast packet including a request to join a distributed system and including indication of code for communicating with the machine. The apparatus receives a response including a reference to an entity for registration with the system and transmits a message to the entity to register with the system.

A second apparatus consistent with the present invention receives from a machine a multicast packet including a request to join a distributed system and including indication of code for communicating with the machine. The apparatus uses the code to construct a response including a reference to an entity for registration with the system and transmits the response to the machine.

A third apparatus consistent with the present invention transmits from a first machine a first object including indication of code for communicating with the first machine. The apparatus receives at a second machine the first object and uses the code for constructing a second object for communicating with the first machine. The second object is transmitted from the second machine to the first machine.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Overview

Methods and systems consistent with the present invention provide a technique for joining a device to a distributed network. When the device joins the network, it transmits a multicast packet that includes code or a reference to code for use in communicating with the device. Receivers in the network use the reference to download the code to communicate with the device. The receivers thus need not have prestored code or other information required to communicate with the device, which may enhance network efficiency.

The receivers respond to the multicast packet by transmitting to the device a reference to a lookup service in the network. Using the reference from at least one of the receivers, the device registers itself with the lookup service. A lookup service is described in U.S. patent application filed on even date herewith, assigned to a common assignee, and entitled "Method and System for Facilitating Access to a Lookup Service," which is incorporated herein by reference.

Distributed Processing System

Figure 1:
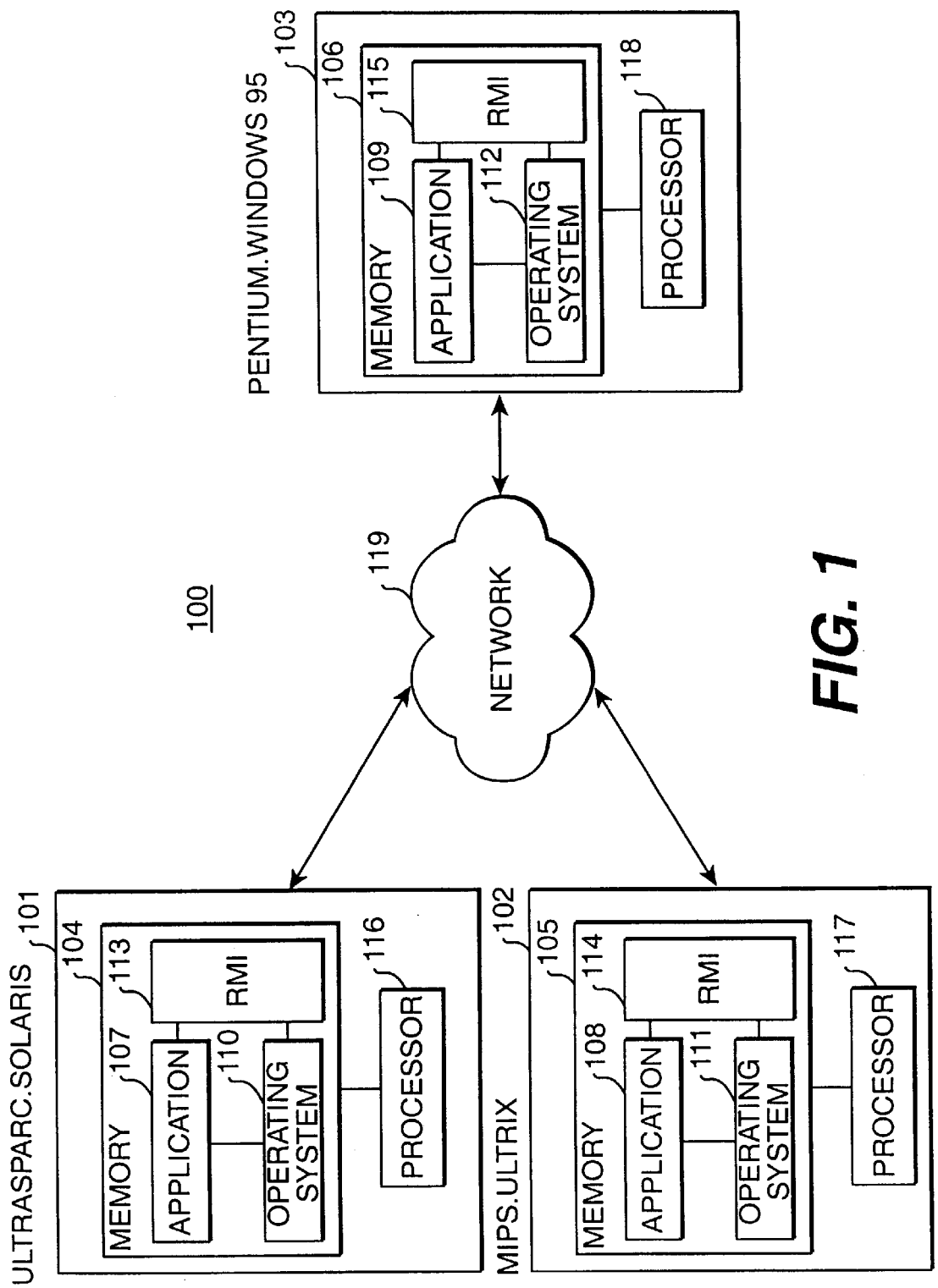
FIG. 1 is a diagram of an exemplary distributed processing system that can be used in an implementation consistent with the present invention.

FIG. 1 illustrates an exemplary distributed processing system 100 which can be used in an implementation consistent with the present invention. In FIG. 1, distributed processing system 100 contains three independent and heterogeneous platforms 101, 102, and 103 connected in a network configuration represented by network cloud 119. The composition and protocol of the network configuration represented by cloud 119 is not important as long as it allows for communication of the information between platforms 101, 102 and 103. In addition, the use of just three platforms is merely for illustration and does not limit an implementation consistent with the present invention to the use of a particular number of platforms. Further, the specific network architecture is not crucial to embodiments consistent with the present invention. For example, another network architecture that could be used in an implementation consistent with this invention would employ one platform as a network controller to which all the other platforms would be connected.

In the implementation of distributed processing system 100, platforms 101, 102 and 103 each include a processor 116, 117, and 118 respectively, and a memory, 104, 105 and 106, respectively. Included within each memory 104, 105, and 106, are applications 107, 108, and 109, respectively, operating systems 110, 111, and 112, respectively, and Java™ remote method invocation components (RMI) components 113, 114, and 115, respectively. RMI is explained in, for example, the following document, which is incorporated herein by reference: Remote Method Invocation Specification, Sun Microsystems, Inc. (1997), which is available via universal resource locator (URL) http://www.javasoft.com/products/jdk/1.1/docs/guide/rmi/spec/rmiTOC.doc.html.

Applications 107, 108, and 109 can be programs that are either previously written and modified to work with, or that are specially written to take advantage of, the services offered by an implementation consistent with the present invention. Applications 107, 108, and 109 invoke operations to be performed in accordance with an implementation consistent with this invention.

Operating systems 110, 111, and 112 are typically standard operating systems tied to the corresponding processors 116, 117, and 118, respectively. The platforms 101, 102, and 103 can be heterogenous. For example, platform 101 has an UltraSparc® microprocessor manufactured by Sun Microsystems, Inc. as processor 116 and uses a Solaris® operating system 110. Platform 102 has a MIPS microprocessor manufactured by Silicon Graphics Corp. as processor 117 and uses a Unix operating system 111. Finally, platform 103 has a Pentium microprocessor manufactured by Intel Corp. as processor 118 and uses a Microsoft Windows 95 operating system 112. An implementation consistent with the present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 103, 104, and 105 serve several functions, such as general storage for the associated platform. Another function is to store applications 107, 108, and 109, RMI components 113, 114, and 115, and operating systems 110, 111, and 112 during execution by the respective processor 116, 117, and 118. In addition, portions of memories 103, 104, and 105 may constitute shared memory available to all of the platforms 101, 102, and 103 in network 119. Note that RMI components 113, 114, and 115 operate in conjunction with a JVM, which is not shown for the purpose of simplifying the figure.

Distributed System Infrastructure

Systems and methods consistent with the present invention may also operate within a particular distributed system 200, which will be described with reference to FIGS. 2 and 3. This distributed system 200 is comprised of various components, including hardware and software, to (1) allow users of the system to share services and resources over a network of many devices; (2) secured distributed systems; and (3) simplify the task of administering the distributed system. To accomplish these goals, distributed system 400 utilizes the Java programming environment to allow both code and data to be moved from device to device in a seamless manner. Accordingly, distributed system 200 is layered on top of the Java programming environment and exploits the characteristics of this environment, including the security offered by it and the strong typing provided by it.

Figure 2:
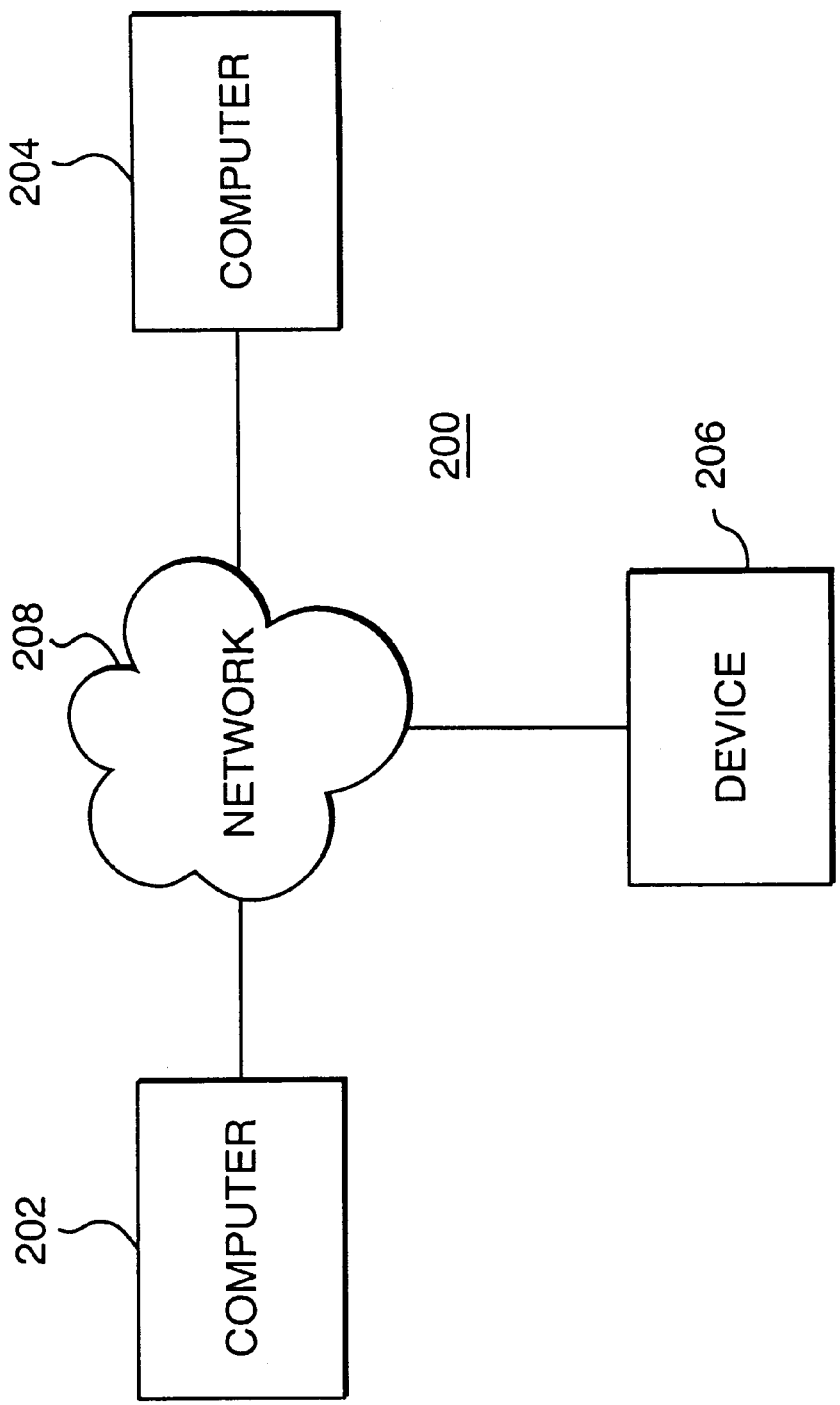
FIG. 2 is a diagram of an exemplary distributed system infrastructure.
Figure 3:
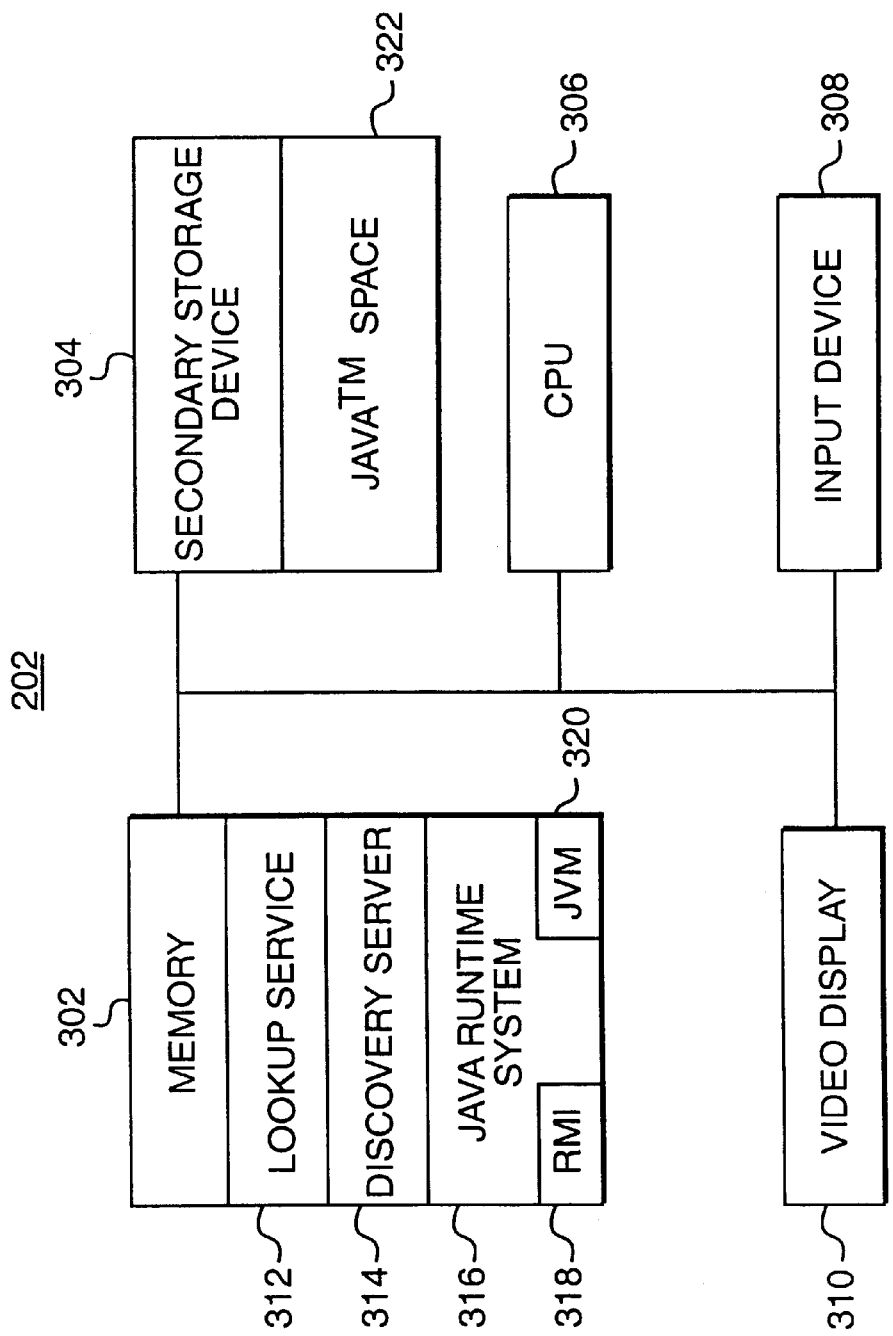
FIG. 3 is a diagram of a computer in a distributed system infrastructure shown in FIG. 2.

In distributed system 200 of FIGS. 2 and 3, different computers and devices are federated into what appears to the user to be a single system. By appearing as a single system, distributed system 200 provides the simplicity of access and the power of sharing that can be provided by a single system without giving up the flexibility and personalized response of a personal computer or workstation. Distributed system 200 may contain thousands of devices operated by users who are geographically disperse, but who agree on basic notions of trust, administration, and policy.

Within an exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as programs or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn, to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

Distributed system 200 is comprised of computer 202, a computer 204, and a device 206 interconnected by a network 208. Device 206 may be any of a number of devices, such as a printer, fax machine, storage device, computer, or other devices. Network 208 may be a local area network, wide area network, or the Internet. Although only two computers and one device are depicted as comprising distributed system 200, one skilled in the art will appreciate that distributed system 200 may include additional computers or devices.

FIG. 3 depicts computer 202 in greater detail to show a number of the software components of distributed system 200. One skilled in the art will appreciate that computer 204 or device 206 may be similarly configured. Computer 202 includes a memory 302, a secondary storage device 304, a central processing unit (CPU) 306, an input device 308, and a video display 310. Memory 302 includes a lookup service 312, a discovery server 314, and a Java runtime system 316. The Java runtime system 316 includes the Java RMI system 318 and a JVM 320. Secondary storage device 304 includes a Java space 322.

As mentioned above, distributed system 200 is based on the Java programming environment and thus makes use of the Java runtime system 316. The Java runtime system 316 includes the Java API libraries, allowing programs running on top of the Java runtime system to acess, in a plateform-independent manner, various system functions, including windowing capabilities and networking capabilities of the host operating system. Since the Java API libraries provides a single common API across all operating systems to which the Java runtime system is ported, the programs running on top of a Java runtime system run in a platform-independent manner, regardless of the operating system or hardware configuration of the host platform. The Java runtime system 316 is provided as part of the Java software development kit available from Sun Microsystems, Inc. of Mountain View, Calif.

JVM 320 also facilitates platform independence. JVM 320 acts like an abstract computing machine, receiving instructions from programs in the form of bytecodes and interpreting these bytecodes by dynamically converting them into a form for execution, such as object code, and executing them. RMI 318 facilitates remote method invocation by allowing objects executing on one computer or device to invoke methods of an object on another computer or device. Both RMI and the JVM are also provided as part of the Java software development kit.

Lookup service 312 defines the services that are available for a particular Djinn. That is, there may be more than one Djinn and, consequently, more than one lookup service within distributed system 200. Lookup service 312 contains one object for each service within the Djinn, and each object contains various methods that facilitate access to the corresponding service. Lookup service 312 is described in U.S. patent application entitled "Method and System for Facilitating Access to a Lookup Service," which was previously incorporated herein by reference.

Discovery server 314 detects when a new device is added to distributed system 200, during a process known as boot and join (or discovery), and when such a new device is detected, the discovery server passes a reference to lookup service 312 to the new device so that the new device may register its services with the lookup service and become a member of the Djinn. After registration, the new device becomes a member of the Djinn, and as a result, it may access all the services contained in lookup service 312. The process of boot and join is described in U.S. patent application entitled "Apparatus and Method for providing Downloadable Code for Use in Communicating with a Device in a Distributed System," which was previously incorporated herein by reference.

A Java space 322 is an object repository used by programs within distributed system 200 to store objects. Programs use a Java space 322 to store objects persistently as well as to make them accessible to other devices within distributed system 200. Java spaces are described in U.S. patent application Ser. No. 08/971,529, entitled "Database System Employing Polymorphic Entry and Entry Matching,"

assigned to a common assignee, and filed on Nov. 17, 1997, which is incorporated herein by reference. One skilled in the art will appreciate that an exemplary distributed system 200 may contain many lookup services, discovery servers, and Java spaces.

Data Flow in a Distributed Processing System

Figure 4:
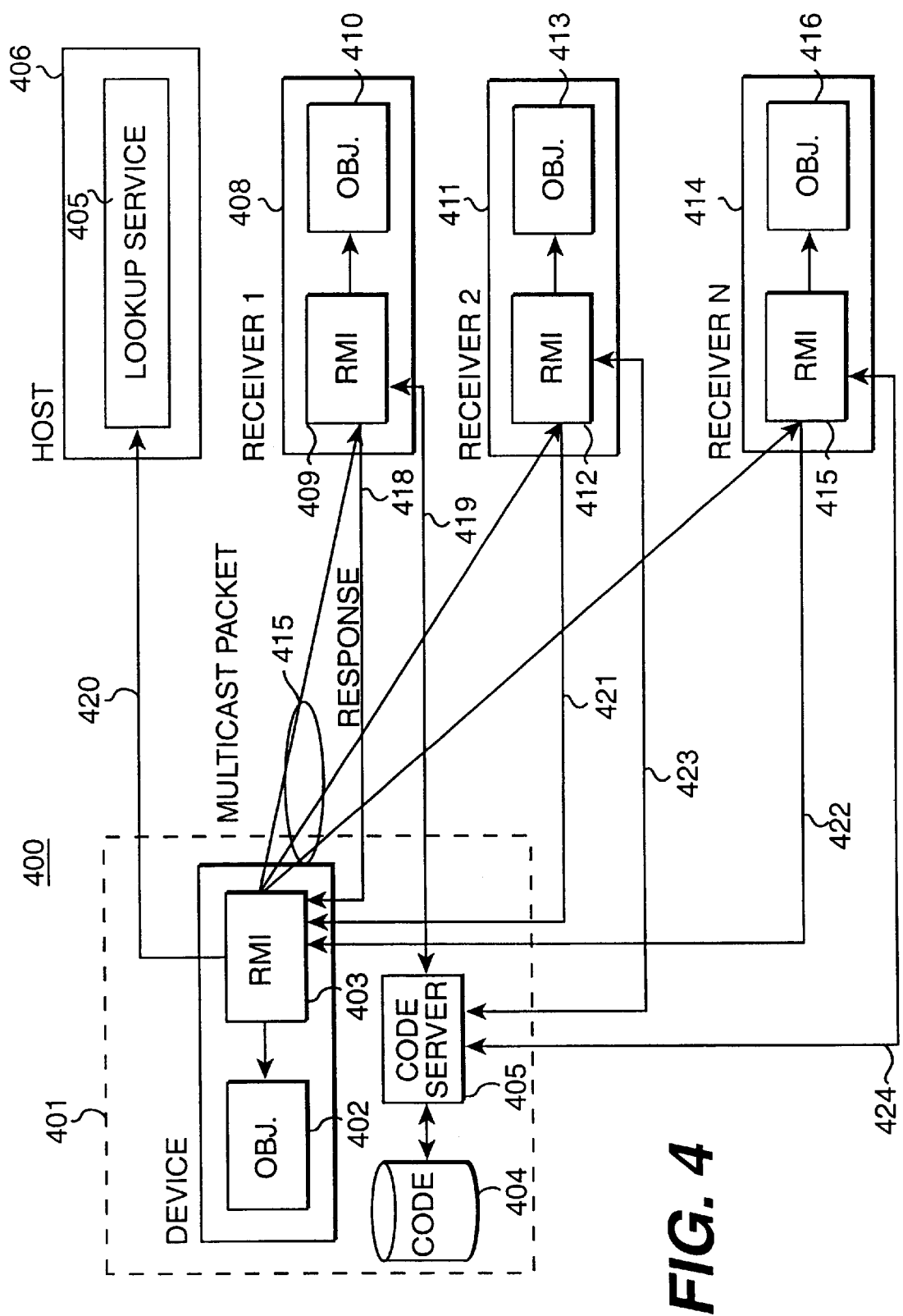
FIG. 4 is a diagram of an exemplary distributed network illustrating a device joining the network.

FIG. 4 is a diagram of an exemplary object-oriented distributed network or system 400 connecting machines 401, 408, 411, and 414, such as computers or virtual machines executing on one or more computers, or the machines described with reference to FIGS. 1, 2, and 3. As shown in FIG. 4, transmitting machine or device 401 includes an object 402 and RMI 403 for performing processing on objects. Device 401 intends to join distributed network 400 including other devices or machines, referred to as receivers. Network 400 includes a host 406 containing a lookup service 407 and also includes receivers 408, 411, and 414. Only three receivers are shown for illustrative purposes only; network 400 may include fewer or more receivers and would usually include many receivers. Each receiver shown contains RMI, shown by RMIs 409, 412, and 415. Each of the RMIs for the receivers constructs a remote reference to object 402. These remote references include objects 410, 413, and 416 for, respectively, receivers 408, 411, and 414.

In order to join network 400, device 401 transmits a multicast packet 417 including a an indication of code 404, such as a reference to the code or the code itself, required to communicate with device 401. A multicast packet is a message sent to a plurality of devices in a network. Device 401 uses RMI 403 to provide flexibility, allowing code to be moved when necessary along with information or the object's state and type. Additionally, device 401 may include in multicast packet 417 an identification of the type of object transmitted, the data constituting the state of the object, and a network-accessible location in the form of a URL for code that is associated with the object. Multicast packet 417 may also include a stub for communicating with the booting device. URLs are known in the art and an explanation, which is incorporated herein by reference, appears in, for example, a text entitled "The Java Tutorial: Object-Oriented Programming for the Internet," pp. 494–507, by Mary Campione and Kathy Walrath, Addison-Wesley, 1996.

In response to multicast packet 417, receivers 408, 411, and 414 transmit responses 418, 421, and 422, each response including a reference for use in communicating with lookup service 407. When receiving machine 408 receives multicast packet 417, it identifies the type of transmitted object. In order to send the response and communicate with device 401, receivers 408, 411, and 414 use the reference from device 401 to transmit calls 419, 423, and 424 to code server 405 in order to obtain code 404 for communicating with device 401. A code server is an entity and process that has access to code and responds to requests for a particular type or class of object and returns code for that object. A code server may be located within device 401 or on another machine. Also, the code may be resident on the same platform as the code server or on a separate platform.

RMI 409, for example, may use a URL from multicast packet 417 to locate the code and transfer a copy of the code to receiver 408. Because the code is bytecodes and is therefore portable, a receiving machine can load the code into its RMI to reconstruct the object. Thus, receivers 408, 411, and 414 can reconstruct an object of the appropriate type even if that kind of object has not been present on the machines before.

Receivers 408, 411, and 414 use code 404 to construct an object for transmitting responses 418, 421, and 422. Alternatively, device 401 may transmit the code instead of a reference to the code. Device 401 receives the responses and, using at least one of the transmitted references, registers itself with lookup service 407 via call 420. These calls may be remote procedure calls, and the objects may be transmitted as byte streams. Device 401 may transmit a message to register with a lookup service, the message containing information identifying the device so that machines using the lookup service may access or communicate with the device. Remote procedure calls, and methods for downloading code, are described in U.S. patent application Ser. No. 08/950,756, filed on Oct. 15, 1997, and entitled "Deferred Reconstruction of Objects and Remote Loading in a Distributed System," which is incorporated herein by reference. Streams used in the Java programming language, including input and output streams, are known in the art and an explanation, which is incorporated herein by reference, appears in, for example, a text entitled "The Java™ Tutorial: Object-Oriented Programming for the Internet," pp. 325–53, by Mary Campione and Kathy Walrath, Addison-Wesley, 1996.

Process for a Device to Join a Network

Figure 5:
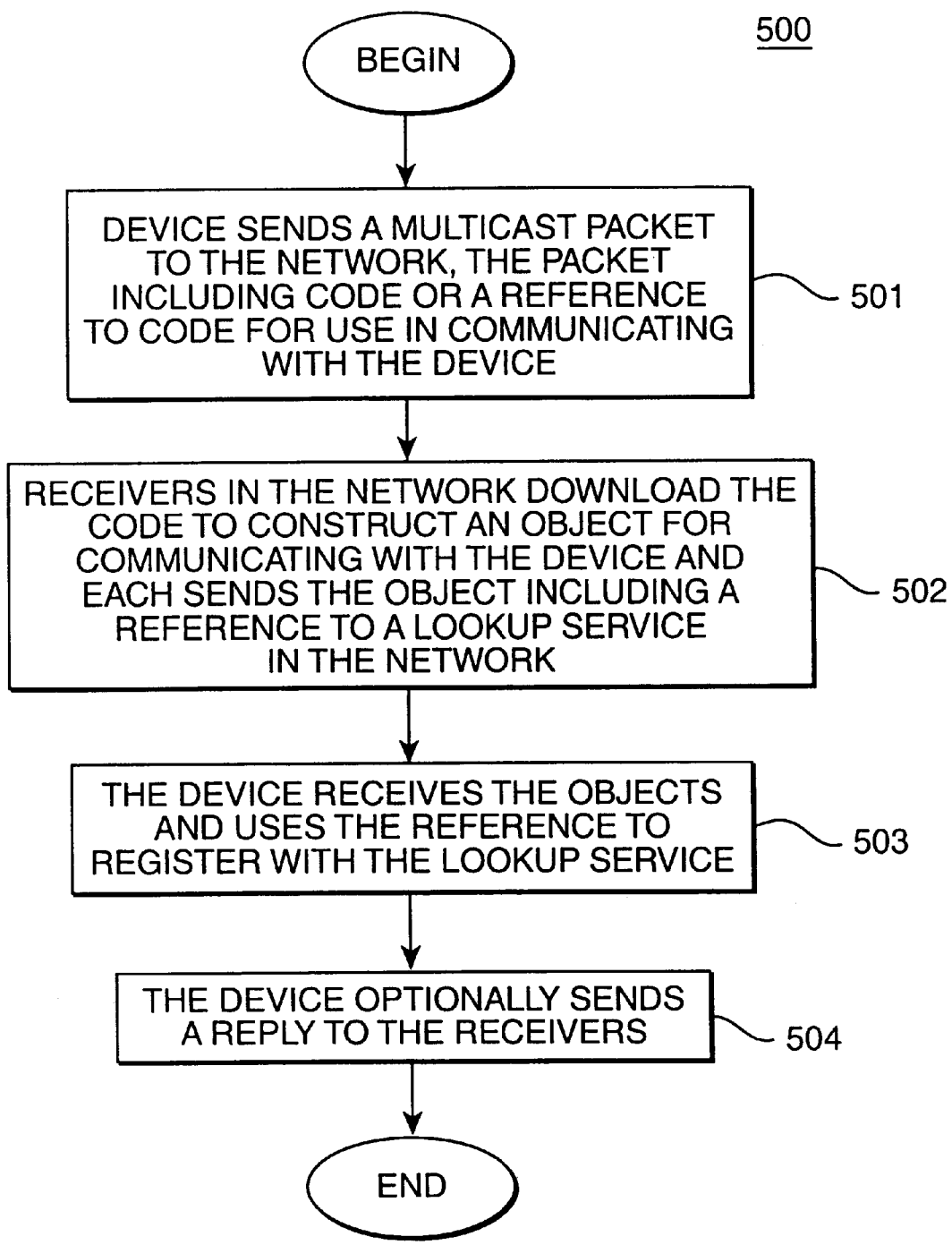
FIG. 5 is a flow chart of a process for a device to join a distributed network.

FIG. 5 is a flow chart of a process 500 for device to join a network, such as distributed network 400. A device wishing to join a network transmits a multicast packet to the network, the packet including an indication of code, such as a reference to code or the code itself, for use in communicating with the device (step 501). Table 1 shows in pseudocode an example of information in a multicast packet. This packet may be transmitted from what is referred to as a bootstrap or discovery request service, which runs on the discovery server identified above with reference to FIG. 3 and accepts requests for references to a lookup service. Therefore, when a device joins a network in this example, referred to as "boot" into a Djinn, it may use the bootstrap request service to boot into the network.

TABLE 1

| | |
|---|---|
| bootstrap protocol version | int protoVersion; |
| transport-specific endpoint info | Object endpoint; |
| device ID | String id = DeviceID.getDevice ID (); |
| URL from which to load stub | java.net.URL codebase; |
| name of the stub class | String stubType;<br>ByteArrayOutputStream byteStr = new ByteArrayOutputStream ();<br>ObjectOutputStream objStr = new ObjectOutputStream (byteStr);<br>objStr.writeInt (protoVersion);<br>objStr.writeObject (endpoint);<br>objStr.writeUTF (id);<br>objStr.writeUTF (codebase.toExternalForm ());<br>objStr.writeUTF (stubType); |
| the final product | byte [] packetBody = byteStr.toByteArray (); |

The following is an explanation of the fields of the exemplary packet shown in Table 1. The "protoVersion" field contains an integer which indicates the version of the bootstrap protocol in operation for a device to join a network. The "endpoint" field encapsulates transport-dependent endpoint information which allows instances of the bootstrap request service to construct valid references to the bootstrap response service on the booting entity. The "id" field contains a "Device ID" string, which identifies the booting device. The "codebase" field provides a URL from which instances of the bootstrap request service can download stub code for the bootstrap response service. The "stubType" field provides a fully-qualified name of the stub class for the bootstrap response service.

Upon receiving the multicast packet receivers in the network download the code to construct an object for communicating with the device. The receivers each transmit the object to the device, the object including a reference to a lookup service in the network (step 502). The receivers may use what is referred to as a bootstrap or discovery response service, which runs on a discovering (booting) entity and accepts references to the lookup service. Table 2 illustrates an exemplary Java interface for a bootstrap response service.

TABLE 2

```
public interface    ResponseService extends java.rmi.Remote
{
    public void     advertiseLookup (ServiceRegistrar lookup)
            throws java.rmi.RemoteException;
}
```

The receivers, through the bootstrap response service, provide a reference to an object that implements a service registrar, which may correspond to the lookup service explained in U.S. patent application filed on even date herewith, assigned to a common assignee, and entitled "Dynamic Lookup Service for a Distributed System," which is incorporated herein by reference. If the device received no response to the multicast packet, it may continue sending multicast packets at regular intervals.

Upon receiving the object, the device uses at least one of the reference transmitted by the receivers in order to register with the lookup service (step 503) through the service registrar. After registration, the lookup service subsequently contains an identification of the device, and it is thus accessible to other entities in the network. In addition to registering with the lookup service, the device may optionally respond, providing notification of its registration or other information, to each of the receivers from which it received a response to the multicast packet (step 504).

The protocol and method described above may also be used for providing an object containing all behavior necessary to communicate with a particular device. Thus, devices do not necessarily require that they maintain an indication of code for communicating with the particular device, as they may obtain that information from the particular device using the method described above.

Machines implementing the steps shown in FIG. 5 may include computer processors for performing the functions, as shown in FIGS. 1, 2, 3, and 4. They may include modules or programs configured to cause the processors to perform the above functions. They may also include computer program products stored in a memory. The computer program products may include a computer-readable medium or media having computer-readable code embodied therein for causing the machines to perform functions described above. The media may include a computer data signal embodied in a carrier wave and representing sequences of instructions which, when executed by a processor, cause the processor to securely address a peripheral device at an absolute address by performing the method described in this specification. The media may also include data structures for use in performing the method described in this specification.

Although the illustrative embodiments of the systems consistent with the present invention are described with reference to a computer system implementing the Java programming language on the JVM specification, the invention is equally applicable to other computer systems processing code from different programming languages. Specifically, the invention may be implemented with both object-oriented and nonobject-oriented programming systems. In addition, although an embodiment consistent with the present invention has been described as operating in the Java programming environment, one skilled in the art will appreciate that the present invention can be used in other programming environments as well.

While the present invention has been described in connection with an exemplary embodiment, it will be understood that many modifications will be readily apparent to those skilled in the art, and this application is intended to cover any adaptations or variations thereof. For example, different labels or definitions for the multicast packet may be used without departing from the scope of the invention. This invention should be limited only by the claims and equivalents thereof.

What is claimed is:

1. A method for processing downloadable code for use in communicating with a machine in a distributed system comprised of multiple machines, the method comprising:

receiving from a machine a multicast packet including a request to join the distributed system and including an indication of code for communicating with the machine;

using the indication of code to download the code;

constructing an object using the downloaded code to communicate with the machine;

constructing a response to the machine including a reference to an entity for registration with the system; and transmitting the response to the machine.

2. The method of claim 1, wherein using the indication of code to access and download the code further comprises:

using a universal resource locator to download the code.

3. The method of claim 1, wherein receiving from the machine the multicast packet further comprises:

including in the multicast packet an identification of at least one of the type and state of the object to be downloaded.

4. The method of claim 1, wherein the multicast packet includes a stub for communicating with a booting device.

5. An apparatus for processing downloadable code for use in communicating with a machine in a distributed system comprised of multiple machines comprising:

a receiving module for receiving from a machine a multicast packet including a request to join the distributed system and including an indication of code for communicating with the machine;

a use module for using the indication of code to download the code;

a constructing module for constructing an object using the downloaded code to communicate with the machine;

a constructing module for constructing a response to the machine including a reference to an entity for registration with the system; and a transmitting module for transmitting the response to the machine.

6. The apparatus of claim 5, wherein the use module for using the indication of code to access and download the code further comprises:

a use module for using a universal resource locator to download the code.

7. The apparatus of claim 5, wherein the receiving module for receiving from the machine the multicast packet further comprises:

an including module for including in the multicast packet an identification of at least one of the type and state of the object to be downloaded.

8. The apparatus of claim 5, wherein the multicast packet includes a stub for communicating with a booting device.

9. A computer-readable medium containing instructions for processing downloadable code for use in communicating with a machine in a distributed system comprised of multiple machines comprising:

receiving from a machine a multicast packet including a request to join the distributed system and including an indication of code for communicating with the machine;

using the indication of code to download the code;

constructing an object using the downloaded code to communicate with the machine;

constructing a response to the machine including a reference to an entity for registration with the system; and transmitting the response to the machine.

10. The computer-readable medium of claim 9, wherein using the indication of code to access and download the code further comprises:

using a universal resource locator to download the code.

11. The computer-readable medium of claim 9, wherein receiving from the machine the multicast packet further comprises:

including in the multicast packet an identification of at least one of the type and state of the object to be downloaded.

12. The computer-readable medium of claim 9, wherein the multicast packet includes a stub for communicating with a booting device.

* * * * *